United States Patent
Wiese et al.

(10) Patent No.: US 11,758,915 B2
(45) Date of Patent: Sep. 19, 2023

(54) METHOD OF PRODUCING A SIMPLIFIED CHEESE SPREAD AND PRODUCTS THEREFROM

(71) Applicant: Kraft Foods Group Brands LLC, Chicago, IL (US)

(72) Inventors: Jonathan Wiese, Chicago, IL (US); Judith Moca, Palatine, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 791 days.

(21) Appl. No.: 16/229,377

(22) Filed: Dec. 21, 2018

(65) Prior Publication Data

US 2020/0196621 A1    Jun. 25, 2020

(51) Int. Cl.
A23C 19/076   (2006.01)
A23C 19/032   (2006.01)
A23C 19/05    (2006.01)

(52) U.S. Cl.
CPC .......... *A23C 19/076* (2013.01); *A23C 19/032* (2013.01); *A23C 19/053* (2013.01); *A23C 2220/206* (2013.01); *A23V 2002/00* (2013.01); *A23V 2250/206* (2013.01); *A23V 2250/506* (2013.01); *A23V 2250/507* (2013.01); *A23V 2250/54252* (2013.01)

(58) Field of Classification Search
CPC .... A23C 19/076; A23C 19/053; A23C 21/026
See application file for complete search history.

(56) References Cited

U.S. PATENT DOCUMENTS

| | | |
|---|---|---|
| 5,470,593 A | 11/1995 | Meilinger et al. |
| 5,676,984 A | 10/1997 | Bohanan et al. |
| 6,217,917 B1 | 4/2001 | Bodor et al. |
| 6,689,402 B1 | 2/2004 | Nauth et al. |
| 7,250,183 B2 | 7/2007 | Lindstrom et al. |
| 7,323,199 B2 | 1/2008 | De Vuyst et al. |
| 7,780,970 B2 | 8/2010 | Schlothauer et al. |
| 9,185,921 B2 | 11/2015 | Jacobsen et al. |
| 9,462,817 B2 | 10/2016 | Gutknecht et al. |
| 9,635,870 B2 | 5/2017 | Gutknecht et al. |
| 9,775,366 B2 | 10/2017 | Woldschoon-Pombo et al. |
| 2007/0059398 A1 | 3/2007 | Archer et al. |
| 2008/0050467 A1 | 2/2008 | Buranachokpaisan et al. |
| 2009/0068310 A1 | 3/2009 | Bot et al. |
| 2011/0020495 A1 | 1/2011 | Wolfschoon-Pombo |
| 2012/0045546 A1 | 2/2012 | Faergemand et al. |
| 2012/0219663 A1 | 8/2012 | Gutknecht et al. |
| 2012/0219664 A1 | 8/2012 | Gutknecht et al. |
| 2013/0202737 A1 | 8/2013 | Hassan et al. |
| 2013/0273202 A1* | 10/2013 | Wolfschoon-Pombo ............ A23C 19/053 426/36 |
| 2014/0057018 A1 | 2/2014 | Zheng et al. |
| 2016/0100599 A1 | 4/2016 | Jacobsen et al. |
| 2016/0157504 A1 | 6/2016 | Carrington-Bataller et al. |
| 2016/0219894 A1 | 8/2016 | El Soda et al. |
| 2017/0164633 A1 | 6/2017 | Havea et al. |
| 2018/0132498 A1 | 5/2018 | Moss |
| 2021/0307346 A1* | 10/2021 | Odinot ................. A23C 9/1422 |

FOREIGN PATENT DOCUMENTS

| | | |
|---|---|---|
| EP | 1350433 A1 | 10/2003 |
| WO | 2001095736 A2 | 12/2001 |
| WO | 2004013343 A3 | 2/2004 |
| WO | 2005002361 A1 | 1/2005 |
| WO | 2005074694 A1 | 8/2005 |
| WO | 2006119871 A1 | 11/2006 |
| WO | 2010103126 A1 | 9/2010 |
| WO | 2014031842 A1 | 2/2014 |
| WO | 2016168853 A1 | 10/2016 |

OTHER PUBLICATIONS

Briczinski E P et al: "Production of an Exopolysaccharide-Containing Whey Protein Concentrate by Fermentation of Whey", Journal of Dairy Science, American Dairy Science Association, US, vol. 85, No. 12, Dec. 1, 2002, pp. 3189-3197.

Danisco: "Product Description-PD 205735-16.OEN Probat 505 Fro 500 DCU", Dec. 28, 2016, pp. 1-3.

European Extended Search Report for Application No. EP 19899804 dated Jul. 20, 2022, 13 pages.

Mintel; Anonymous: "Original Cream Cheese", Aug. 23, 2018; 3 pages.

Smewing, Jo: "Texture Analysis Professionals Blog: Ten ways to measure Cheese Texture", Nov. 18, 2014, pp. 1-5.

* cited by examiner

*Primary Examiner* — Jeffrey P Mornhinweg
(74) *Attorney, Agent, or Firm* — Fitch, Even, Tabin & Flannery LLP

(57) ABSTRACT

Novel cheese products and methods of producing such cheese products that include a biogenerated exopolysaccharide (EPS) formed in-situ and separate from the main cream cheese fermentation. In some approaches, the methods and cheese products herein build a unique texture and/or microstructure that permits the cheese to utilize a simplified ingredient line while still mimicking the desired organoleptic characteristics of more-conventional, full-ingredient cheese.

20 Claims, 5 Drawing Sheets

METHOD OF PRODUCING A SIMPLIFIED CHEESE SPREAD AND PRODUCTS THEREFROM

TECHNICAL FIELD

This disclosure relates to methods of producing full to reduced-fat cheese, such as a cream cheese or a cream cheese spread, having a simplified ingredient listing and to products thereof.

BACKGROUND

Cream cheese is a soft, acid-coagulated uncured cheese made from a mixture of cream and milk. Cream cheese is commonly stored under refrigeration conditions and the body of cream cheese is generally smooth and butter-like. The texture and body of cream cheese at refrigeration temperatures is such that the cream cheese can be sliced and spread. In making conventional cream cheese, whole milk and/or skim milk together with cream are blended in pre-selected proportions to form a cream cheese mix. This cream cheese mix normally has a fat content of from about 10 percent to about 20 percent, while a finished full-fat cream cheese typically has a fat content from about 22 percent to about 35 percent and a finished reduced-fat cream cheese generally has a fat content from about 15 to about 21 percent.

To produce cream cheese, a mix of milk and cream is first pasteurized and homogenized. After cooling (usually to a temperature between about 60° F. and about 95° F.), the mix is inoculated with a conventional lactic acid producing culture. Rennet may be used to aid the coagulation of the mixture. The mix is held at an appropriate inoculation temperature until it has ripened and a coagulum is formed often to a pH generally from about 4.1 to about 4.9. After the desired acidity is obtained, the curd is typically separated from the whey and then packaged. One well known process for making cream cheese and separating curd from whey includes a mechanical separation of the curd and whey as disclosed in U.S. Pat. No. 2,387,276 to Link. As explained in the Link patent, after the mix is ripened to form a coagulum, the coagulum is heated to an elevated temperature to break the viscosity of the mix. The heated mix is centrifuged at the elevated temperature to separate the curd from the whey.

After fermentation, various thickeners, texture modifiers, and/or stabilizers are often added to the cream cheese to improve product characteristics including final product texture, creaminess, and/or to control syneresis. Typical additives in cream cheese include gums like locust bean gum, guar gum, xanthan gum, gum arabic and the like. Such conventionally produced cream cheese has a smooth, creamy consistency and delicate taste and aroma will little to no syneresis.

Some conventional texture modifiers or stabilizers used in cream cheese, such as gums like xanthan gum, tend to be less desired by consumers who perceive the additives as being non-natural. However, removing these additives from cream cheese tends to be problematic because it becomes difficult to mimic the finished product characteristics of conventional cream cheese that consumers come to expect. Removing one or more thickeners, texture modifiers, and/or stabilizers presents problems with certain finished product characteristics like mouthfeel, texture, creaminess, and/or spreadability.

SUMMARY

One aspect of the disclosure provides a method of producing a cream cheese having reduced levels of added gums and/or added stabilizers. In some approaches, the method includes (a) preparing a cheese curd through fermentation of a dairy liquid; (b) inoculating a whey protein containing dairy liquid having a whey protein level, based on solids, of about 30 to about 70 percent with an exopolysaccharide-producing culture, the inoculated whey protein containing dairy liquid being separate from the cheese curd fermentation of step (a); (c) fermenting the whey protein containing dairy liquid for a time and temperature to produce a biogenerated exopolysaccharide in the whey protein dairy liquid; (d) combining the cheese curd obtained after the fermentation of step (a) and the biogenerated exopolysaccharide-containing whey protein dairy liquid of step (c) in a mixing tank; (e) combining one or more stabilizers with the cheese curd and the biogenerated exopolysaccharide-containing whey protein dairy liquid, the one or more stabilizers being substantially free of added xanthan gum; and (f) blending the combination of step (e) to form the cream cheese having the reduced levels of one or more added gums and/or added stabilizers.

In other aspects or embodiments, the method of the previous paragraph may also be combined with optional features either individually or in combination. These optional features of the method include one or more of: wherein a whey stream is separated from the fermented dairy liquid of step (a) before combining the cheese curd with the biogenerated exopolysaccharide-containing whey protein dairy liquid of step (c); and/or wherein the one or more stabilizers include locust bean gum, guar gum, carrageenan gum, and mixtures thereof; and/or wherein the cream cheese is free of xanthan gum; and/or wherein the cream cheese has a fat-to-protein ratio of about 4:1 to about 5:1; and/or wherein the dairy liquid of step (a) and the whey protein containing dairy liquid of step (b) includes amounts of protein and fat to achieve the fat-to-protein ratio of the cream cheese; and/or wherein the cream cheese has about 20 to about 25 percent fat; and/or wherein the exopolysaccharide-producing culture is a *Lactobacillus rhamnosus, Lactobacillus delbrueckii* subsp. *bulgaricus, Lactococcus lactis* ssp. *cremoris, Lactobacillus helveticus, Lactobacillus casei, Lactobacillus paracasei, Streptococcus thermophilus,* or *Lactococcus lactis* subsp. *lactis*, or combinations thereof; and/or wherein the blended combination of step (f) builds a yield stress of about 60 to about 90 pascals in about 40 to about 80 minutes of mixing; and/or wherein the whey protein containing dairy liquid is inoculated with about 0.0005 to about 0.2 weight percent of the exopolysaccharide producing culture; and/or wherein the fermentation of the dairy liquid forming the curd includes an exopolysaccharide producing culture; and/or wherein the cream cheese exhibits a cohesiveness of about 30 to about 40 percent without added xanthan gum.

In another aspect of this disclosure, a cream cheese having reduced levels of added gums and/or added stabilizer is provided. In some approaches or embodiments, the cream cheese is made by a process including any of the method steps of the previous two paragraphs. In other aspects, the cream cheese may include optional features. In some approaches, these optional features include, wherein the cream cheese exhibits a firmness profile at about 5° C. of about 50,000 to about 60,000 pascals, at about 25° C. of about 6,000 to about 7,000 pascals, and at 37° C. of about 2,000 to about 3,000 pascals; and/or wherein the cream cheese exhibits a cohesive factor of about 30 percent to about 40 percent reflecting the relative cheese firmness at 37° C. to cheese firmness at 25° C.

In yet other aspects, a cream cheese having reduced levels of added gums and/or added stabilizers is described herein. In some approaches or embodiments of this aspect, the cream cheese includes about 20 to about 25 weight percent fat; about 2 to about 5 percent protein provided from casein and whey protein; a fat-to-protein ratio of about 3:1 to about 5:1; one or more added stabilizers selected from locust bean gum, guar gum, carrageenan gum, and mixtures thereof, the added stabilizers being substantially free of xanthan gum; a biogenerated exopolysaccharide; and a cohesive factor of about 30 percent to about 40 percent reflecting the relative cheese firmness at about 37° C. relative to cheese firmness at about 25° C.

In other aspects, the cheese of the previous paragraph may be combined with optional features either individually or in any combination thereof. These optional features include one or more of: further including a junction density between the biogenerated exopolysaccharide and the whey protein sufficient to achieve a firmness profile at about 5° C. of about 50,000 to about 60,000 pascals, at about 25° C. of about 6,000 to about 7,000 pascals, and at 37° C. of about 2,000 to about 3,000 pascals and with the cream cheese being substantially free of added xanthan gum; and/or wherein the cream cheese has a bimodal particle size distribution; and/or wherein the bimodal particle size distribution has a mean particle size of about 1 to about 8 microns, a D10 particle size of about 0.2 to about 0.4 microns, a D50 particle size of about 0.5 to about 1.0 microns, and a D90 particle size of about 15 to about 30 microns; and/or wherein a first mode of the bimodal particle size distribution has a mean particle size of about 0.3 to about 3 microns and the second mode of the bimodal particle size distribution has a mean particle size of about 20 to about 90 microns; and/or wherein the protein form a continuous protein phase with the biogenerated exopolysaccharide dispersed as particulate contained within the continuous protein phase; and/or wherein the biogenerated exopolysaccharide is obtained in-situ by fermenting a whey protein concentrate with an exopolysaccharide generating culture; and/or wherein the cream cheese includes about 0.02 to about 0.25 percent guar gum and about 0.05 to about 0.5 percent locust bean gum and no xanthan gum.

DETAILED DESCRIPTION

Figure 1:
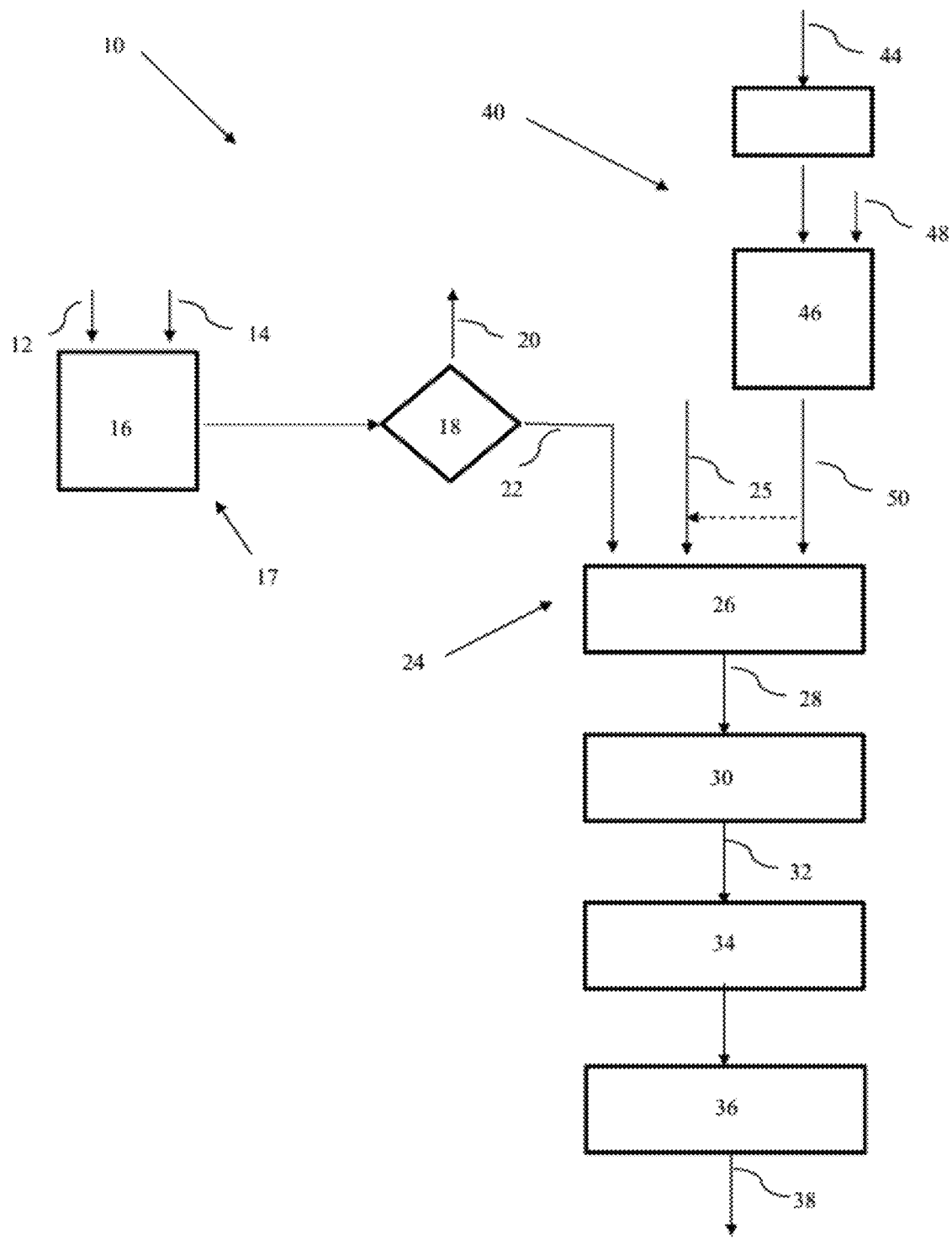
FIG. 1 is a flowchart of an exemplary process as described herein.

In one aspect, the present disclosure describes novel cheese products and methods of producing such cheese products that include a biogenerated exopolysaccharide (EPS) formed in-situ and separate from the main cream cheese fermentation. In some approaches, the methods and cream cheese herein exhibits a texture and builds a unique protein microstructure that permits the cheese herein to utilize a simplified ingredient line while still mimicking the desired organoleptic characteristics of more-conventional, full-ingredient cheese. For example, the methods of making, the in-situ generated EPS, and/or the unique protein microstructures discovered herein are particularly suited for use in full-to-reduced fat, soft-variety cheeses like cream cheese, cream cheese spreads, and other soft dairy-type cheese or spreads to reduce or eliminate one or more added gums and/or added stabilizers while still mimicking the characteristics of the conventional cheese or dairy product. In one approach, the cheese herein include this unique protein microstructure and are substantially free of added xanthan gum while still maintaining desired textures and mouthfeel of the traditional xanthan-gum including cheese.

In other aspects, the present disclosure describes methods to produce in-situ EPS and, in some approaches, to develop or build a unique protein-polysaccharide microstructure or protein-EPS microstructure that creates the desired textures and firmness with reduced levels of added gums or stabilizers and, in other approaches, without the need for certain added gums and/or stabilizers. In one approach, the methods and resulting cream cheese included reduced levels of xanthan gum and, in some approaches, no xanthan gum.

As used herein, reduced levels, free of, in the absence of, devoid of, or substantially free of generally refers to a method or a product having non-functional amounts of the particular ingredient, such as xanthan gum. In one approach, such amounts are less than 0.1 weight percent, less than about 0.08 weight percent, less than about 0.05 weight percent, less than about 0.02 weight percent, or no detectible amounts of such ingredient, such as xanthan gum, in the final product.

To form the cheese products herein, the methods and resulting cheese first utilize a conventional cheese curd obtained using common techniques that are dependent on the finished cheese product desired. For instance, the curd produced, the type of culture selected, and the composition of starting milk or dairy mix will play a role in determining the characteristic flavors and aromas in the desired cheese. The starting milk or dairy mix may be varied, for example, by using milk of different fat levels (such as, no-fat or skim milk, low-fat milk, full-fat or whole milk, whole milk with added fat, and the like). The milk or dairy product composition may also be varied, for example, by inclusion of additional dairy components such as milk solids, cream, and the like. Examples of particular cheese varieties that may be prepared by the methods of the present disclosure include by way of non-limiting example, cream cheese, cream cheese spreads, fresh dairy spreads, and other soft and spreadable cheeses. While the methods and techniques herein may be suited for any soft, spreadable cheese desiring a simplified ingredient listing through use of in-situ generated exopolysaccharide and/or the unique protein/EPS microstructure of the products herein, the methods are most suited for cream cheese manufacture and hereafter will be described by reference to cream cheese and to methods for producing cream cheese.

Turning to FIG. 1, a method 10 of forming a cream cheese product is shown. The method uses a starting dairy liquid 12 that contains desired proportions of milk and cream to provide a fat-to-protein ratio suitable for cream cheese. In one approach, this starting mix 12 includes about 55 to about 80 percent milk and about 20 to about 45 percent cream to produce a fat-to-protein ratio ranging from about 5:1 to about 6:1, and in other approaches, about 5.2:1 to about 5.8:1. This starting mix 12 may be homogenized, optionally ultrafiltered via a membrane with a suitable pore size (not shown in FIG. 1), and exposed to a brief pasteurization treatment as needed for a particular application. After cooling, the resulting mix 12 is seeded with an appropriate starter culture 14 for cream cheese and allowed to ferment in a main fermentation tank 16 under conditions appropriate for coagulating the mixture to form a coagulated mix. The coagulation is induced by the acidity resulting from the fermentation of lactose in the starting dairy liquid 12 to lactic acid. Fermentation is terminated by a brief exposure to an elevated temperature that inactivates the culture. In one approach, the resulting curd is then separated 18, for example, by a centrifugal separator, discarding the whey 20 and retaining the cream cheese curd 22.

The starting dairy liquid or mix 12 includes liquids containing dairy proteins and fats in desired amounts. This starting dairy liquid 12 is typically a mixture of dairy ingredients normally used to make cream cheese and includes a blend of milk and cream, and normally has a fat content of about 4 to about 35 percent, in some approaches about 6 to about 30 percent, and in other approaches about 10 to about 20 percent and a protein content of about 1 to about 5, in other approaches, about 2 to about 4, and in yet other approaches, about 2 to about 3 percent. If desired, the starting dairy liquid is standardized by a conventional process to obtain a desired fat and protein level. The fat-to-protein ratios of the starting dairy liquid 12 are mentioned above As used herein, "dairy liquid" generally refers to milk, milk products obtained by fractionation of raw milk, creams, and blends thereof. In certain approaches, the starting dairy liquid 12 includes a mixture of cream and milk. The starting dairy liquid 12 may have a moisture concentration of about 55 to about 90 percent, and in other approaches, about 70 to about 85 percent. The starting dairy liquid 12 may have a casein/whey ratio of about 90/10 to about 20/80, and in other approaches, about 80/20 to about 30/70. The dairy liquids employed in the present disclosure, such as those in starting dairy liquid 12, may originate from any lactating livestock animal whose milk is useful as a source of human food. Such livestock animals include, by way of non-limiting example, cows, buffalo, other ruminants, goats, sheep, and the like. Generally, however, cows' milk is the preferred dairy liquid used herein. Dairy liquids include casein, which relates to any, or all, of the phosphoproteins in milk, and to mixtures of any of them. An important characteristic of casein is that it forms micelles in naturally occurring milk and in the dairy liquids employed herein. Casein includes, but is not limited to, α-casein (including $α_{s1}$-casein and $α_{s2}$-casein), β-casein, κ-casein, and their genetic variants. Dairy liquids may also include whey protein, which generally refers to the proteins contained in the liquid obtained as a supernatant of the curds when milk or a dairy liquid containing milk components are curded to produce a cheese-making curd as a semisolid. Whey protein typically includes the globular proteins β-lactoglobulin and α-lactalbumin. Dairy liquids may also include a fat source, which is typically a dairy fat, such as cream or butter fat. The fat source may be provided by the milk or cream or may be added separately as needed to achieve a desired protein to fat ratio.

The starter culture 14 used in the main fermentation tank 16 are lactic acid-producing bacteria such as lactic-acid producing strains of *Streptococcus, Lactococcus*, or *Leuconostoc* such as *Streptococcus lactis, Streptococcus cremoris, Streptococcus diacetyllactis, Leuconostoc cremoris, Betacoccus cremoris, Lactococcus lactis* subsp. *lactis, Lactococcus lactis* subs. *biovar diacetylactis, Lactococcus lactis* subsp. *cremoris*, combinations thereof or *Leuconostoc* sp. and the like. These lactic acid-producing bacteria can be used alone or in combinations thereof. Not to be limited by theory, such lactic acid-producing bacteria are used in the cheese manufacturing to ferment lactose present in the starting dairy liquid 12. The lactic acid-producing cultures 14 may be added in amounts which are conventional for cream cheese manufacture (for instance, typically about 10,000 to 100,000 bacteria/g of dairy liquid). The cultures 14 can be added as freeze-dried, frozen, or liquid cultures.

The process 10 includes a main fermentation 17 (i.e., culturing) in main tank 16 as is typically carried out until the pH of the dairy liquid is reduced to about 4.0 to about 5.0, preferably about 4.4 to about 4.9. Typically, the culturing is carried out at temperatures of between about 70 and about 90° F. until the desired pH is obtained (generally between about 1 and about 24 hours). As discussed further below, the process 10 also includes a secondary fermentation 40 that is conducted separate from and in a distinct fermentation tank.

The resultant curd 22 from the fermentation after whey separation 18 is then combined 24 with various post-additives 25. In some approaches, the post-additives 25 include one or more of additional dried whey, salt, and stabilizers. The stabilizers are selected from locust bean gum (LBG), carrageenan gum, and/or guar gum. Notably, the stabilizers are substantially free of or devoid of xanthan gum. If desired, cream may also be added as part of the post-additives 25 if needed for a particular application.

As explained in the background, xanthan gum was commonly one of the conventional post-additives 25 in conventional cream cheese processing. This ingredient is becoming undesired in foods, but simply removing or reducing xanthan gum in cheese presents challenges in maintaining consistent product quality. For instance, it was discovered if xanthan gum levels were reduced or even eliminated in cream cheese to provide a simpler ingredient composition, then the resulting cream cheese generally did not maintain desired levels of texture, creaminess, or mouthfeel. On the other hand, it was unexpectedly discovered that if the separate and secondary fermentation step 40 (discussed below) is included in the cream cheese process, then bio-generated exopolysaccharides are produced in-situ and, in some cases, a unique protein/EPS microstructure is developed in the cream cheese that permits the reduction of or even the elimination of xanthan gum from the final composition while still maintaining desired product characteristics. As shown in the examples and not to be limited by theory, it is believed that the in-situ or biogenerated exopolysaccharides of the present disclosure result in a unique cohesiveness of the cream cheese between room temperature and mouthfeel temperatures (25° C. and 37° C., respectively). Again, while not wishing to be limited by theory, the cohesiveness or cohesive factor represents the ability of the cheese to form a sufficient protein junction density (protein/EPS structure or matrix) to maintain texture and integrity. This is achieved surprisingly without the need for xanthan gum.

In one approach, this separate or secondary fermentation step 40 is a distinct and an isolated fermentation from the above-described, main fermentation step 17. This new fermentation step 40 starts with a separate concentrated dairy liquid 44 that is fermented in a secondary fermentation tank 46 with exopolysaccharide (EPS)-producing culture(s) 48. This additional fermentation step 40 is separate from, distinct from, or isolated from the conventional curd forming steps 17 utilized for the cream cheese processing in main tank 16. Without wishing to be limited by theory, it was surprisingly discovered that if the EPS-producing cultures are used in a separate fermentation 40 that is then blended with the curd 22 along with the post-additives 25, then a unique protein microstructure, a protein-polysaccharide microstructure, or a protein-EPS microstructure is formed or developed in the cheese product. If the additional EPS-producing cultures 48 were directly added to the first fermentation 17 along with the lactic-acid producing cultures 14 in main tank 16, then the desired EPS structures, ingredient interactions, texture, and possibly the unique protein microstructures are not developed in the final product.

As used herein, the "concentrated dairy liquid" of stream 44 is a concentrated dairy protein source wherein dairy proteins are at concentration levels greater than the dairy liquid from which they originated. Examples of concentrated dairy liquids include, but are not limited to, whey protein concentrate, whey protein isolate, milk protein concentrate, or combination of whey protein concentrate and milk protein concentrate. Preferably, the concentrated dairy liquid 44 is a whey protein concentrate. Typically, the whey protein concentrate includes protein concentration of at least about 34 percent (based on solids). In one approach, the concentrated dairy liquid 44 is a whey protein concentrate having whey protein levels greater than conventional dairy liquids.

As used herein, "whey protein concentrate" or "WPC" for short is different from other types of whey protein, such as whey protein isolate (WPI). WPC is generally a white to light cream colored product with a bland but clean flavor. Although non-protein constituents can be removed, the protein concentration of WPC is generally about 10 to about 85 percent, and more usually, about 25 to about 75 percent, and in other approaches, about 45 to about 75 percent protein (based on total solids). The WPC may have fat, but less than about 1 percent fat. The WPC may be produced by concentrating the whey through ultrafiltration, where low molecular weight compounds are filtered from the whey to a permeate stream and the whey proteins are concentrated in a retentate stream. The WPC can, for instance, be selected from the group consisting of dry whey protein concentrate, liquid whey protein concentrate and any combination thereof. Dried whey is reconstituted before use herein. WPC having about 34, 50, or 70 percent protein (based on solids) may be used in the secondary fermentation 40 herein. In another approach, the concentrated dairy liquid 44 is a whey protein containing dairy liquid having about 20 to about 30 percent solids with about 10 to about 20 percent whey protein (based on the total dairy liquid).

The exopolysaccharide-producing cultures 48 used in the secondary fermentation step 40 with the concentrated dairy liquid 44 is, in some approaches, EPS-producing forms of *Lactobacillus rhamnosus, Lactobacillus delbrueckii* subsp. *bulgaricus, Lactococcus lactis* ssp. *cremoris, Lactobacillus helveticus, Lactobacillus casei, Lactobacillus paracasei, Streptococcus thermophilus, Lactococcus lactis* subsp. *lactis*. These EPS producing cultures may be used individually or in any combination thereof. In some approaches, the concentrated dairy liquid 44 is inoculated with about 0.0005 to about 0.2 weight percent of the EPS-producing culture 48. Upon fermentation, biogenerated exopolysaccharide is obtained in-situ by fermenting the whey protein concentrate stream. This separate fermentation 40 of the EPS-producing culture and the concentrated dairy liquid 44 (and preferably the whey protein concentrate) occurs until the pH of the concentrate reaches about 4.0 to about 5.5, and preferably, about 4.3 to about 5.0, and more preferably, about 4.3 to about 4.8. Temperature of the fermentation is about 72° F. to about 95° F. Fermentation is stopped by cooling to 35° F. once target pH is reached.

The resulting fermentate 50 from this secondary fermentation step 40 is then combined with the post-additives 25 or separately added along with the post-additives 25 to a mixer 26. In some approaches, about 80 to about 90 weight percent curd 22 is blended with about 1 to about 5 weight percent powder blend in the post additives 25 and about 3 to about 10 percent of the WPC fermentate 50. A typical post-additive blend 25 may include about 40 to about 65 percent dried whey, about 20 to about 30 percent salt and other seasonings, about 5 to about 15 percent locust bean gum, about 0 to about 1 percent edible acid, 0 to about 1 percent preservative, and about 1 to about 5 percent guar gum. Preferably, the resultant blend 28 of the curd, post-additives, and fermented WPC has a fat-to-protein ratio of about 3:1 to about 5:1, and in other approaches, about 2:1 to about 4:1.

This blend 28 (that is, curd 22, post-additives 25, and fermentate 50) is then mixed 26 (in one or more mixers) for an effective time and temperature to build a desired texture or yield stress. In some approaches, typical mixing times are about 40 to about 80 minutes of mixing to achieve a target yield stress of about 60 to about 90 pascals. Surprisingly, this texture build is achieved with the methods herein even without the presence of xanthan gum, which was previously believed needed to achieve desired cream cheese textures. In some approaches, the mixed blend 28 is optionally homogenized 30 at a pressure of about 1,000 to about 8,000 psi (in other approaches, about 1,500 to about 6,000 psi, and in yet further approaches, at about 2,500 to about 4,000 psi). Homogenization provides reduced particle sizes in the mixture. In some approaches, it is preferred to attain an average particle size less than about 2.5 microns, and more preferably, a particle size less than about 1.5 microns. In some approaches, particle size ranges from about 0.1 microns to about 300 microns with the majority of particles at about 1 and about 30 microns. After homogenization, the composition may be heated 32, optionally filtered 34, creamed 36, and then packaged into the cream cheese product 38.

Figure 6:
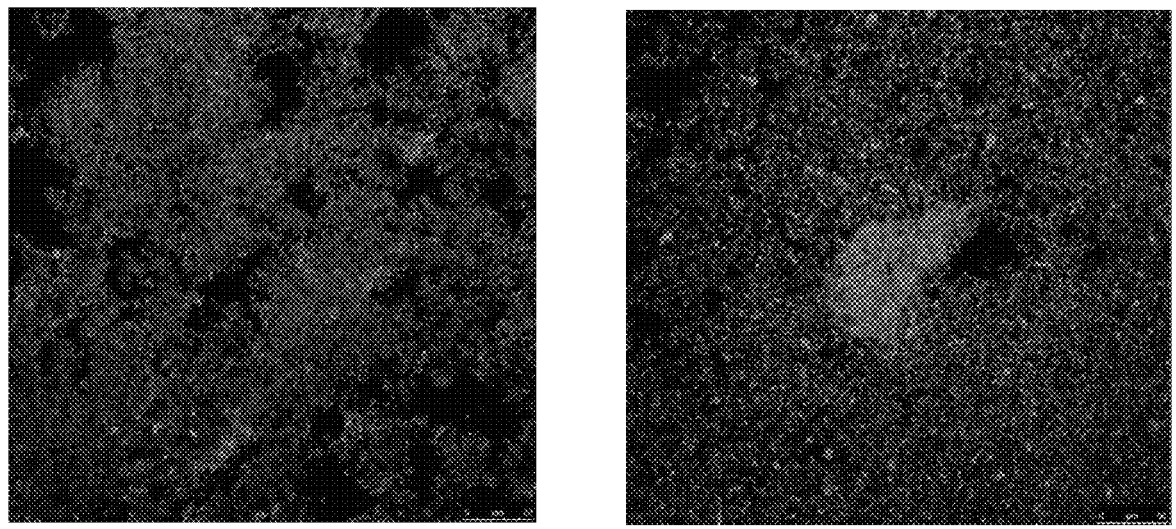
FIG. 6 are representative micrographs of cheese protein microstructures.

The formed protein/EPS microstructure results in a cheese having an unique protein junction density forming sufficient intermolecular interactions and bonds in the cheese matrix. This junction density results in continuous protein phrase (casein and/or whey) with the biogenerated exopolysaccharide dispersed as particulates or aggregates dispersed within the continuous protein phase. In one approach, the protein junction density is such that the resultant cream cheese exhibits a firmness profile at about 5° C. (refrigeration temperatures) of about 50,000 pascals to about 60,000 pascals, at about 25° C. (room temperatures) of about 6,000 pascals to about 7,000 pascals, and at 37° C. (eating or mouthfeel temperature) of about 2,000 pascals to about 3,000 pascals. In other approaches, the protein/EPS microstructure exhibits a cohesiveness or cohesive factor of about 30% to about 40% between mouthfeel temperatures (37° C.) and room temperature (25° C.) as discussed more in the Examples below. Such junction density, cohesive factor, or firmness profile is achieved without the need for substantial levels of xanthan gum as discussed above, but in some approaches by including the biogenerated EPS together with locust bean gum and guar gum. An example of the protein microstructure can be seen in the images of FIG. 6.

Figure 7:
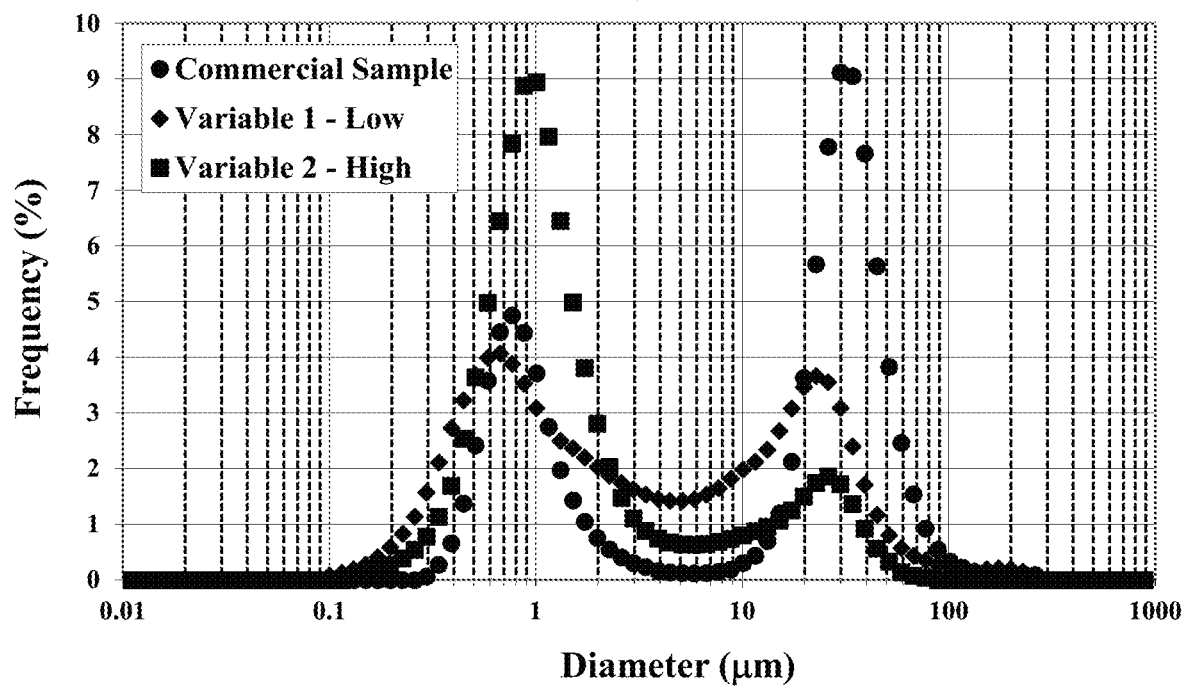
FIG. 7 is a plot of particle size.

In some approaches, the cream cheese has a bi-modal particle size distribution as shown in FIG. 7 having two distinct particle size peaks in the distribution. This particle size distribution may have an overall mean particle size of about 1 to about 8 microns while a mean particle size of the first mode may be about 0.3 to about 3 microns and a mean particle size of the second mode may be about 20 to about 90 microns. In yet other approaches, a D10 particle size of the overall distribution may be about 0.2 to about 0.4 microns, a D50 particle size of the overall distribution may be about 0.5 to about 1.0 microns, and a D90 particle size of overall distribution may be about 15 to about 30 microns.

Typical cream cheese compositions made by the processes herein may include about 50 to about 70% milk, about 20 to about 40% cream, and about 2 to about 10% whey protein concentrate. The cream cheese may further include about 0.01 to about 0.25 percent guar gum (in other approaches, about 0.02 to about 0.1%) and about 0.05 to about 1.0 percent locust bean gum (in other approaches, about 0.1 to about 0.5%) and substantially no xanthan gum as discussed above. If a full fat cheese, the resulting cream cheese has about 22 to about 35 percent fat, and if a reduced fat cheese, about 15 to about 21 percent fat. The cheese may also include about 3 to about 10 percent of the WPC fermentate 50.

The cheese produced by the methods herein may also have a cohesiveness or a cohesive factor consistent to traditional, xanthan-gum containing cream cheese. As used herein, cohesiveness, cohesive, or cohesive factor is a characteristic of the cheese microstructure representing a breakdown of cheese between room and eating temperatures and reflects the protein microstructure and/or junction density of the continuous protein matrix and EPS in the cheese formed using the methods and compositions herein. As used herein, the cohesive factor or cohesiveness is a percent of cheese firmness as measured at 37° C. to cheese firmness measured at 25° C. That is, firmness at 37° C. divided by firmness at 25° C. Firmness is measured using an Ares G2 rheometer (TA Instruments) as explained in more detail in the Examples. The unique methods and cheese herein have a cohesive factor of about 30 percent to about 40 percent, in other approaches, about 30 to about 35 percent.

EXAMPLES

The following examples are illustrative of exemplary embodiments or approaches of the disclosure. In these examples, as well as elsewhere in this disclosure, all ratios, parts, and percentages are by weight unless otherwise indicated. It is intended that these examples are being presented for the purpose of illustration only and are not intended to limit the scope of the invention disclosed herein.

Comparative Example 1

Production samples of full-fat cream cheese (that is, cream cheese having about 20 to about 25 percent fat and, in this particular example, about 22 percent fat) were prepared with varying types of gums in a post-additive powder blend (that is, the post-additive stream 25 of FIG. 1) to determine the effect of varying the post-add gum type on product quality. In this study, comparative full-fat cream cheese samples were prepared with no added gums (Comparative Sample 1), with only locust bean gum (Comparative Sample 2), and with both locust bean gum and guar gum (Comparative sample 3). None of the comparative samples included added xanthan gum and none of the samples included an exopolysaccharide producing culture in a supplemental fermentation. Otherwise, the cream cheese was prepared using a conventional cream cheese process.

Comparative Samples 1 to 3 without xanthan gum were compared to a commercially available Philadelphia-Brand, full-fat soft cream cheese including locust bean gum, guar gum, and xanthan gum (Sample 4). Thus, this Example evaluated cream cheese prepared in a conventional manner to cream cheeses prepared with changes to the types of post added stabilizer gums.

A rheological thermal analysis of the linear viscoelastic properties of the formed cream cheese was measured as a function of temperature. The rheometer used for the evaluation was an Ares G2 (TA Instruments) using a 25 mm cross-hatched parallel plate with a 50 mm cross-hatched bottom plate and a geometry gap of about 2 mm. Testing involved a temperature range from 0° C. to 80° C. at a 5° C./min heating rate. For the testing, strain was about 0.5 to about 5%, and strain was varied within the linear viscoelastic region to maintain a torque of about 0.1 to about 100 nM·m. Frequency was about 10 rad/s. Sample loading was about 30° C. (cooled to 0° C. before starting the test) and the sampling rate was about 12 s/point. Results are shown in Tables 1 and 1A below at various temperature points reflecting different conditions of the cream cheese: about 5° C. to reflect cream cheese at refrigeration temperatures, about 25° C. to reflect cream cheese at room temperature, about 37° C. to reflect cream cheese at mouth or eating temperatures, and about 80° C. to reflect cream cheese at typical processing temperatures.

TABLE 1

| | Properties at 5 C. (Refrigerated Temperature) | | | | Properties at 25 C. (Room Temperature) | | | |
| --- | --- | --- | --- | --- | --- | --- | --- | --- |
| ID | Firm (Pa) | Relaxation Time (s) | Apparent Zero Shear Viscosity (Pa · s) | Complex Viscosity at 10 rad/s | Firm (Pa) | Relaxation Time (s) | Apparent Zero Shear Viscosity (Pa · s) | Complex Viscosity at 10 rad/s |
| 1 | 123347 | 0.423 | 52165 | 12004 | 15304 | 0.389 | 5946 | 1482 |
| 2 | 65431 | 0.406 | 26553 | 6353 | 7649 | 0.381 | 2916 | 740 |
| 3 | 46156 | 0.382 | 17633 | 4465 | 5907 | 0.393 | 2320 | 572 |
| 4 | 40712 | 0.393 | 16018 | 3946 | 6501 | 0.400 | 2602 | 631 |

TABLE 1A

| | Properties at 37 C. (Mouth Temperature) | | | | | Properties at 80 C. (processing Temperature) | | | |
|---|---|---|---|---|---|---|---|---|---|
| ID | Firm (Pa) | Relaxation Time (s) | Apparent Zero Shear Viscosity (Pa · s) | Complex Viscosity at 10 rad/s | Cohesive (%) | Firm (Pa) | Relaxation Time (s) | Apparent Zero Shear Viscosity (Pa · s) | Complex Viscosity at 10 rad/s |
| 1 | 3017 | 0.657 | 1982 | 298 | 19.7% | 1341 | 0.808 | 1084 | 133 |
| 2 | 1991 | 0.594 | 1183 | 196 | 26.0% | 970 | 0.627 | 608 | 96 |
| 3 | 1685 | 0.572 | 964 | 166 | 28.5% | 877 | 0.663 | 581 | 87 |
| 4 | 2239 | 0.576 | 1289 | 221 | 34.4% | 1019 | 0.687 | 700 | 101 |

The cream cheese with no added gums (Comparative Sample 1) was significantly firmer than the other samples throughout the temperature range and dramatically firmer than the commercial cream cheese control (Sample 4). This appears to be driven by a stronger fat and protein network than the other samples. The sample containing only locust bean gum (Comparative Sample 2) was significantly firmer than the sample with locust bean and guar gum (Comparative Sample 3) at temperatures below 30° C. This difference appears to be the result of a stronger fat network that developed due to locust bean. Above 30° C., there is little significant difference in the firmness of the two gum-containing samples (Comparative Samples 2 and 3). The sample containing both locust bean and guar gum (Comparative Sample 3) had a stronger protein network than the comparative sample containing only locust bean gum. This difference appeared not to impact the firmness above 30° C. as there was little significant difference in the firmness of the two samples containing gums. The no gum sample (Comparative Sample 1) was significantly less "cohesive" (that is, a percent of cheese breakdown from 25° C. to 37° C. or firmness at 37° C. divided by firmness at 25° C.) than all the other samples. As a result, the no gum cheese (Comparative Sample 1) may feel softer in mouth than samples with lower firmness at mouth temperature (37° C.). The sample containing locust bean and guar gum (Comparative Sample 3) was slightly more cohesive than the sample containing just locust bean. Thus, the locust bean and guar gum sample (Comparative Sample 3) may feel firmer in mouth than the locust bean only cheese (Comparative Sample 2) despite their similar firmness at mouth temperature (37° C.).

However, all Comparative Samples 1 to 3 without added xanthan gum were substantially different that the commercial cream cheese control, particularly as evidenced by the cohesiveness factor, and would likely be perceived as different from the conventional cream cheese. Thus, merely removing xanthan gum from a cheese composition cannot mimic the organoleptic characteristics of the commercial cheese.

Comparative Example 2

Cream cheese was produced in a pilot plant with an EPS-producing culture added to a conventional cream cheese fermentation step (that is, the main fermentation tank 16 in fermentation step 17 of FIG. 1) along with the lactic acid producing cultures to produce cream cheese curd (Comparative Sample 5). This sample was then compared to a conventional cream cheese prepared in the same pilot plant having no EPS producing fermentation in the main fermentation tank (Comparative Sample 6). Each sample included the same post-additives and were blended for about 80 minutes. Comparative Sample 5 included locust bean gum and guar gum. Comparative Sample 6 included locust bean gum, guar gum, and xanthan gum. A rheology study was conducted consistent to that described in Comparative Example 1 above. Results are shown in Tables 2 and 2A.

TABLE 2

| | Properties at 5 C. (Refrigerated Temperature) | | | | Properties at 25 C. (Room Temperature) | | | |
|---|---|---|---|---|---|---|---|---|
| ID | Firm (Pa) | Relaxation Time (s) | Apparent Zero Shear Viscosity (Pa · s) | Complex Viscosity at 10 rad/s | Firm (Pa) | Relaxation Time (s) | Apparent Zero Shear Viscosity (Pa · s) | Complex Viscosity at 10 rad/s |
| 5 | 85140 | 0.395 | 33598 | 8253 | 7956 | 0.375 | 2983 | 769 |
| 6 | 58991 | 0.403 | 23787 | 5726 | 8202 | 0.392 | 3217 | 798 |

TABLE 2A

| | Properties at 37 C. (Mouth Temperature) | | | | | Properties at 80 C. (processing Temperature) | | | |
|---|---|---|---|---|---|---|---|---|---|
| ID | Firm (Pa) | Relaxation Time (s) | Apparent Zero Shear Viscosity (Pa · s) | Complex Viscosity at 10 rad/s | Cohesive (%) | Firm (Pa) | Relaxation Time (s) | Apparent Zero Shear Viscosity (Pa · s) | Complex Viscosity at 10 rad/s |
| 5 | 2265 | 0.616 | 1394 | 224 | 28.4% | 872 | 0.508 | 443 | 86 |
| 6 | 2690 | 0.598 | 1606 | 265 | 32.8% | 1035 | 0.706 | 731 | 102 |

Comparative Sample 5 having an EPS-producing culture added to the conventional cream cheese mix along with the lactic-acid producing cultures (with guar and locust bean gum, but no xanthan gum) could not mimic the properties of the commercially available cream cheese in terms of firmness at the various temperature points and in terms of cohesiveness. Comparative sample 5 made by adding an EPS producing culture to a cream cheese mix would also be perceived as different from conventional cream cheese.

Example 1

A study was conducted evaluating the use of an exopolysaccharide-producing culture (EPS-producing *Lactococcus lactis* ssp. *cremoris*) added to various locations of a cream cheese process. The samples evaluated for this study included:

Sample ID 7: a positive control (commercially available Philadelphia-Brand cream cheese) including locust bean gum, guar gum, and xanthan gum (no EPS);

Sample ID 8: a negative control that included no xanthan and no EPS, but included locust bean gum and guar gum;

Sample ID 9: a WPC only sample produced with the EPS-producing culture added to the WPC side stream (that is, the EPS added via stream 48 of FIG. 1) and including locust bean gum and guar gum;

Sample ID 10: a curd only sample with the same EPS-producing culture added to the main fermentation tank 16 (that is, EPS added via stream 14) with locust bean gum and guar gum; and Sample ID 11: a WPC and Curd sample with EPS-producing cultures added to both main tank 16 and secondary tank 46 (that is, EPS added via stream 14 and via stream 48) with locust bean gum and guar gum.

The positive and negative controls plus the curd only sample had higher fat levels and lower moisture levels than the WPC only and the WPC plus curd samples as shown in Table 3 below. The protein levels in the WPC only and the Curd only sample are slightly lower than the control and the WPC plus curd formula.

TABLE 3

| Sample Name | Sample ID | Fat, % | Moisture, % | Protein, % |
|---|---|---|---|---|
| Positive Control | 7 | 25.53 | 60.93 | 5.43 |
| Negative Control | 8 | 24.83 | 61.90 | 5.35 |
| WPC Only | 9 | 21.50 | 64.50 | 4.88 |
| Curd Only | 10 | 24.30 | 62.38 | 5.16 |
| WPC and Curd | 11 | 22.99 | 63.42 | 5.39 |

Figure 2:
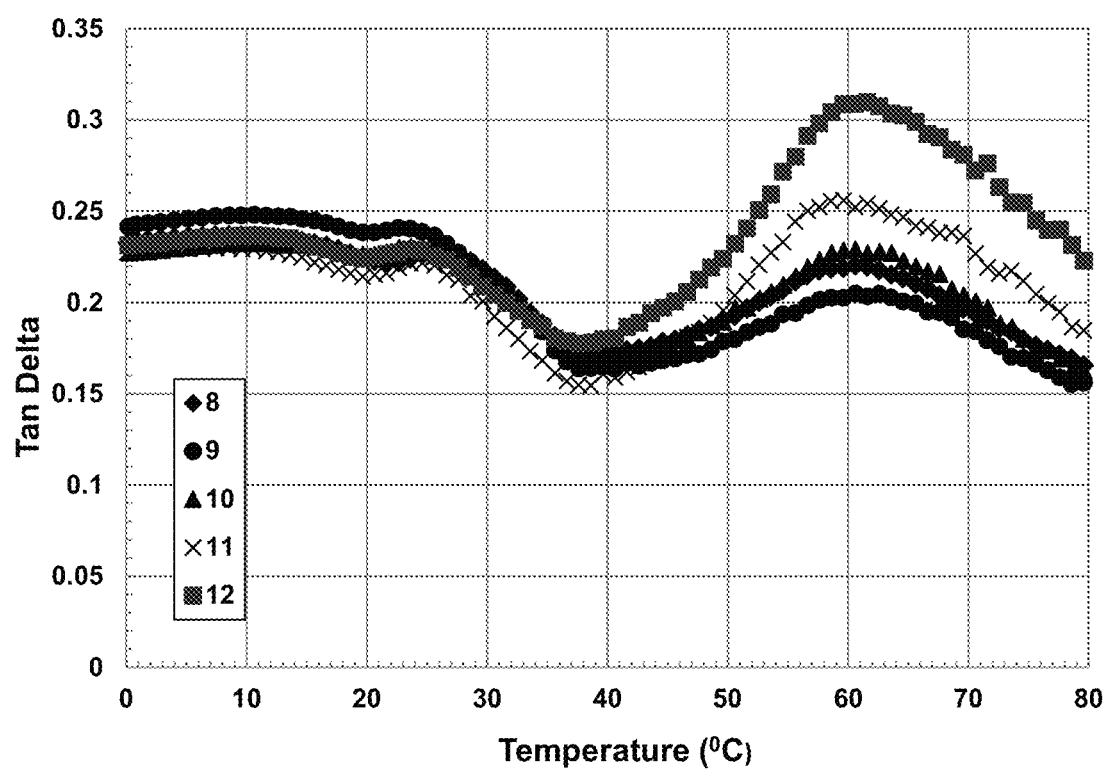
FIG. 2 is a graph of a Tan Delta rheology profile of cheese.

A rheology study was conducted consistent to that described in Comparative Example 1 above. Results are shown in Tables 4 and 4A below. The positive control was significantly firmer than the negative control throughout the temperature range. All three prototypes (Sample IDs 9, 10, and 11) were significantly less firm throughout the temperature range than the positive and negative control. The WPC only sample (Sample ID 9) had tan delta values similar to the positive control indicating that the strength of this sample included fat and protein networks similar to that of the positive control (see graph of FIG. 2). The WPC only sample is less firm across the temperature range, which is likely a result of significantly lower levels of fat and protein and a significantly higher amount of moisture. However, even with higher moisture and lower protein, the WPC only sample (Sample ID 9) still exhibited a strong fat and protein networks similar to the commercial cream cheese as evidenced by the similar tan delta curves, which is believed due to a strong EPS-protein matrix developed during the secondary fermentation of the WPC that is separate from the main fermentation process.

The Curd only prototype had tan delta values below 40° C. indicative of a stronger fat network than the positive control. Above 40° C., the tan delta of the curd only prototype indicates a significantly weaker protein network. The curd only prototype is significantly less firm than the positive control as a result of the weaker protein network, lower levels of fat and protein, and higher amounts of moisture. The WPC and Curd prototype had tan delta values below 40° C. similar to the positive control. Above 40° C., the tan delta of the WPC and curd prototype indicates a significantly weaker protein network. The WPC and Curd prototype is significantly less firm than the positive control as a result of a significantly weaker protein network, lower levels of fat, and higher amounts of moisture.

TABLE 4

| | Properties at 5 C. (Refrigerated Temperature) | | | | Properties at 25 C. (Room Temperature) | | | |
|---|---|---|---|---|---|---|---|---|
| ID | Firm (Pa) | Relaxation Time (s) | Apparent Zero Shear Viscosity (Pa · s) | Complex Viscosity at 10 rad/s | Firm (Pa) | Relaxation Time (s) | Apparent Zero Shear Viscosity (Pa · s) | Complex Viscosity at 10 rad/s |
| 7 | 36775 | 0.423 | 15572 | 3579 | 7976 | 0.439 | 3499 | 778 |
| 8 | 23290 | 0.406 | 9465 | 2262 | 5231 | 0.422 | 2210 | 509 |
| 9 | 14394 | 0.434 | 6254 | 1403 | 3669 | 0.439 | 1610 | 358 |
| 10 | 17941 | 0.436 | 7819 | 1749 | 3354 | 0.454 | 1522 | 328 |
| 11 | 13758 | 0.427 | 5868 | 1339 | 2955 | 0.443 | 1310 | 288 |

TABLE 4A

| | | Properties at 37 C. (Mouth Temperature) | | | | Properties at 80 C. (processing Temperature) | | |
|---|---|---|---|---|---|---|---|---|
| ID | Firm (Pa) | Relaxation Time (s) | Apparent Zero Shear Viscosity (Pa · s) | Complex Viscosity at 10 rad/s | Cohesive (%) | Firm (Pa) | Relaxation Time (s) | Apparent Zero Shear Viscosity (Pa · s) | Complex Viscosity at 10 rad/s |
| 7 | 2109 | 0.576 | 1215 | 208 | 26.45 | 591 | 0.610 | 361 | 58 |
| 8 | 1271 | 0.610 | 775 | 125 | 24.30 | 469 | 0.650 | 305 | 46 |
| 9 | 1004 | 0.589 | 5951 | 99 | 27.38 | 311 | 0.643 | 200 | 31 |
| 10 | 957 | 0.646 | 618 | 95 | 28.53 | 258 | 0.557 | 144 | 25 |
| 11 | 924 | 0.564 | 521 | 91 | 31.27 | 232 | 0.467 | 109 | 23 |

Example 2

The secondary fermentation of a concentrated dairy liquid with an EPS-producing culture was conducted in different types of concentrated dairy streams to evaluate the impact on product quality. A rheological study evaluating EPS-producing cultures in two different types of concentrated dairy streams was compared to a positive control in the form of a commercially available Philadelphia-Brand cream cheese (Sample ID 12). The positive control included xanthan gum, guar gum, and locust bean gum but had no EPS-producing cultures. In this evaluation, Sample ID 13 was an inventive cream cheese produced by a process including EPS-producing cultures in a WPC50 dairy stream (that is, EPS added via stream 48 of FIG. 1) with no xanthan gum in the post adds. This inventive sample was further compared to cream cheese Sample IDs 14, 15, 16, and 17 that were prepared by a process that included EPS producing cultures in a 3× skim milk concentrate (rather than a WPC stream) in a separate fermentation step 40. Sample ID 14 was a cream cheese produced in a process including EPS-producing culture in a 3× skim milk concentrate with locust bean gum (LBG) and guar gum, but no xanthan gum.

Sample ID 15 was a cream cheese produced in a process including an EPS-producing culture in a 3× skim milk concentrate with no gums and blended at step 26 for about 40 minutes. Sample ID 16 was a cream cheese produced in a process consistent to Sample ID 15 (no gums), but blended at step 26 for about 70 minutes, and Sample ID 17 was the same as Sample ID 15 (no gums), but blended for about 90 minutes.

A rheology study consistent to that described in Comparative Example 1 was conducted. Cheese compositions are shown in Table 5, and the rheology results are shown in Tables 6 and 6A.

TABLE 5

| Sample Name | Sample ID | Fat, % | Moisture, % | Protein, % |
|---|---|---|---|---|
| Positive Control | 12 | 23.97 | 63.46 | 5.37 |
| WPC 50 | 13 | 23.66 | 63.93 | 5.43 |
| 3X skim | 14 | 24.63 | 64.08 | 5.03 |
| 3X skim | 15 | 23.94 | — | 5.86 |
| 3x skim | 16 | — | 65.09 | — |
| 3x skim | 17 | — | — | — |

TABLE 6

| | Properties at 5 C. (Refrigerated Temperature) | | | | Properties at 25 C. (Room Temperature) | | | |
|---|---|---|---|---|---|---|---|---|
| ID | Firm (Pa) | Relaxation Time (s) | Apparent Zero Shear Viscosity (Pa · s) | Complex Viscosity at 10 rad/s | Firm (Pa) | Relaxation Time (s) | Apparent Zero Shear Viscosity (Pa · s) | Complex Viscosity at 10 rad/s |
| 12 | 92699 | 0.390 | 36173 | 8980 | 10640 | 0.428 | 4552 | 1039 |
| 13 | 83194 | 0.408 | 33947 | 8080 | 10019 | 0.395 | 3959 | 971 |
| 14 | 62779 | 0.404 | 25340 | 6094 | 8111 | 0.389 | 3153 | 786 |
| 15 | 197323 | 0.424 | 83589 | 19204 | 19524 | 0.386 | 7542 | 1890 |
| 16 | 283730 | 0.427 | 121087 | 27625 | 28803 | 0.417 | 12009 | 2801 |
| 17 | 142769 | 0.426 | 60787 | 13899 | 17177 | 0.401 | 6885 | 1667 |

TABLE 6A

| | Properties at 37 C. (Mouth Temperature) | | | | | Properties at 80 C. (processing Temperature) | | | |
|---|---|---|---|---|---|---|---|---|---|
| ID | Firm (Pa) | Relaxation Time (s) | Apparent Zero Shear Viscosity (Pa · s) | Complex Viscosity at 10 rad/s | Cohesive (%) | Firm (Pa) | Relaxation Time (s) | Apparent Zero Shear Viscosity (Pa · s) | Complex Viscosity at 10 rad/s |
| 12 | 4084 | 0.589 | 2406 | 403 | 38.38 | 1469 | 0.775 | 1138 | 146 |
| 13 | 2673 | 0.616 | 1648 | 264 | 26.68 | 1101 | 0.659 | 725 | 109 |
| 14 | 1935 | 0.554 | 1073 | 190 | 23.86 | 745 | 0.781 | 582 | 74 |
| 15 | 4174 | 0.575 | 2401 | 411 | 21.38 | 1645 | 0.886 | 1458 | 163 |
| 16 | 6742 | 0.580 | 3912 | 664 | 23.41 | 2535 | 0.948 | 2404 | 252 |
| 17 | 3720 | 0.601 | 2235 | 367 | 21.66 | 1403 | 0.870 | 1220 | 139 |

All three no gum samples (Sample IDs 15, 16, and 17) made with an EPS-producing culture in 3× skim milk concentrate had a crumbly and brittle texture not reminiscent of a smooth, soft cream cheese. Below about 30° C., these no gum samples were significantly firmer than the commercial cream cheese. The no gum samples held for about 40 and about 90 minutes had similar texture to the commercial cream cheese above 30° C., while the no gum sample held for 70 minutes (Sample ID 16) was significantly firmer throughout the temperature range. The significant cold texture differences are likely the result of smaller fat droplet sizes in the no gum samples compared to the commercial control. Small fat droplet sizes increase junction density in the fat network, thus increasing firmness. The no gum sample held for 70 minutes is significantly firmer than all other samples as the result of a stronger protein network. Thus, the samples produced with 3× skim milk without any gum could not mimic the organoleptic characteristics of conventional cream cheese.

The sample with an EPS-producing culture in 3× concentrated milk and also containing guar and locust bean gums (Sample ID 14) was significantly less firm across the temperature range than all of the other samples. This appears to be due to a combination of lower protein levels along with a weaker protein network.

The sample with EPS cultured in WPC50 and also containing guar and locust bean gums (Sample ID 13) was similar in texture to the positive control below 25° C., which is the main usage temperature range. The positive control was significantly more cohesive (percent of breakdown from 25° C. to 37° C.) than all the other samples. As a result, the positive control may feel firmer in mouth than samples with similar or greater firmness at mouth temperature (37° C.).

Example 3

Cream cheese Samples 18 and 19 were prepared using different EPS producing cultures (one from Christian Hansen and another from DSM) added separately from the main fermentation (that is, added to fermentation step 40 of FIG. 1). For these samples, post-additives 25 included guar gum and locust bean gum, but no xanthan gum was added. These samples were compared to a commercially prepared Philadelphia-Brand Cream Cheese (Sample ID 20). A rheology study consistent to that described in Comparative Example 1 was conducted. Results are shown in Tables 7 and 7B.

TABLE 7

| | Properties at 5 C. (Refrigerated Temperature) | | | | Properties at 25 C. (Room Temperature) | | | |
| --- | --- | --- | --- | --- | --- | --- | --- | --- |
| ID | Firm (Pa) | Relaxation Time (s) | Apparent Zero Shear Viscosity (Pa · s) | Complex Viscosity at 10 rad/s | Firm (Pa) | Relaxation Time (s) | Apparent Zero Shear Viscosity (Pa · s) | Complex Viscosity at 10 rad/s |
| 18 | 39017 | 0.372 | 14499 | 3768 | 5008 | 0.369 | 1848 | 483 |
| 19 | 56581 | 0.373 | 21083 | 5465 | 6363 | 0.379 | 2412 | 615 |
| 20 | 40712 | 0.393 | 16018 | 3946 | 6501 | 0.400 | 2602 | 631 |

TABLE 7B

| | Properties at 37 C. (Mouth Temperature) | | | | | Properties at 80 C. (processing Temperature) | | | |
| --- | --- | --- | --- | --- | --- | --- | --- | --- | --- |
| ID | Firm (Pa) | Relaxation Time (s) | Apparent Zero Shear Viscosity (Pa · s) | Complex Viscosity at 10 rad/s | Cohesive (%) | Firm (Pa) | Relaxation Time (s) | Apparent Zero Shear Viscosity (Pa · s) | Complex Viscosity at 10 rad/s |
| 18 | 1633 | 0.578 | 944 | 161 | 32.6 | 673 | 0.476 | 320 | 66 |
| 19 | 2130 | 0.574 | 1223 | 210 | 33.48 | 793 | 0.434 | 344 | 77 |
| 20 | 2239 | 0.576 | 1289 | 221 | 34.4% | 1019 | 0.687 | 700 | 101 |

Figure 3:
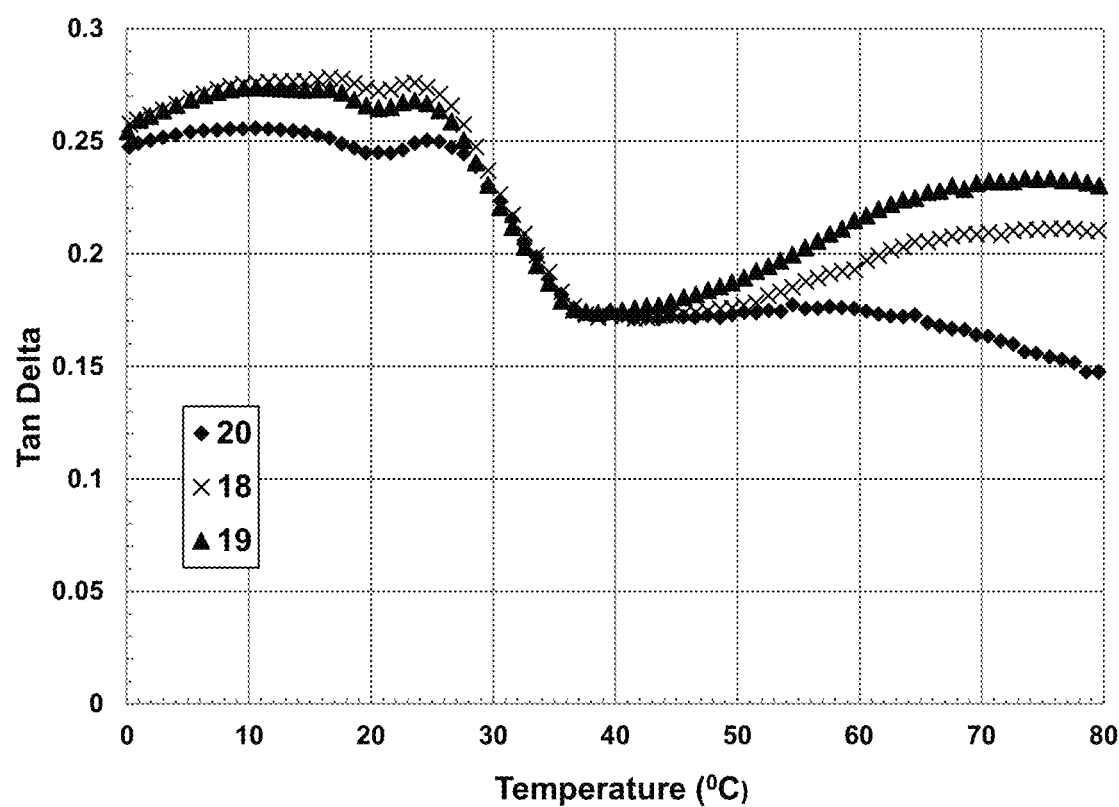
FIG. 3 is another graph of a Tan Delta rheology profile of cheese.

Samples 18 and 19, produced by a method not having xanthan gum in the post-additive powder blend, formed a cream cheese close to the commercially available sample 20, particularly in terms of the cohesive factor evidencing the level of breakdown perceived in the mouth. Differences are believed to be due to the post-additive gum mixture used in these samples. FIG. 3 shows the Tan Delta of the Samples 18 and 19 compared to the commercial sample 20.

Example 4

Figure 4:
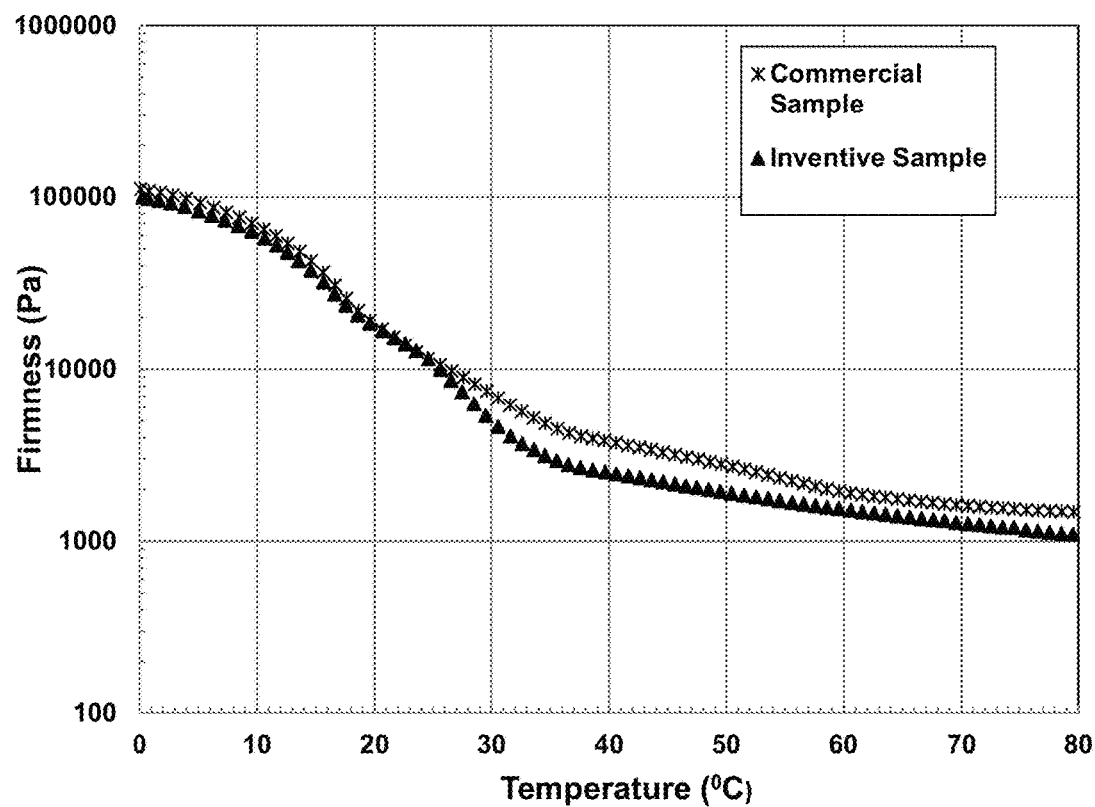
FIG. 4 is a graph of cheese firmness by temperature.
Figure 5:
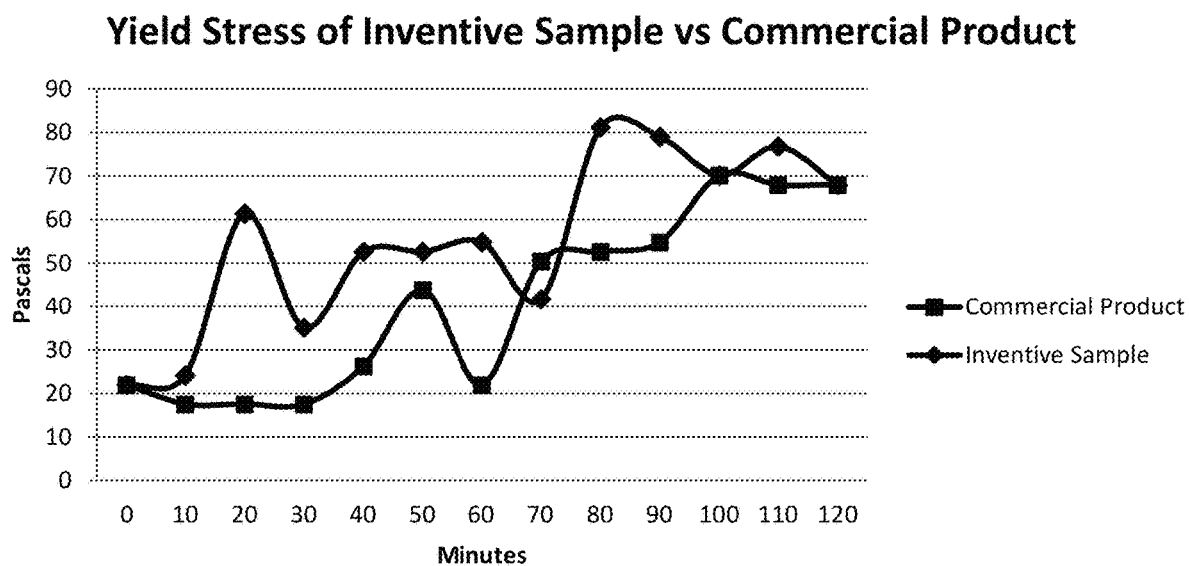
FIG. 5 is a graph of yield stress by mixing time.

A further cream cheese sample was prepared by a process that included EPS producing cultures in a WPC50 whey stream combined with locust bean gum and guar gum as post additives. As shown in FIG. 4, this sample, when compared to a commercially available Philadelphia-Brand cream cheese, exhibited a firmness profile very similar at usage temperatures from about 5° C. to about 37° C. This inventive sample further developed a target yield stress of about 60 to about 90 pascals in about 40 to 80 minutes of mixing consistent with the commercially available cream cheese as shown in FIG. 5. As shown in the representative micrographs of FIG. 6, when locust bean gum and guar gum are combined with biogenerated EPS from an EPS-producing culture added to a WPC stream, a protein microstructure is formed that aids in creating a uniform mixture that minimizes aggregation of proteins and formation of aqueous pockets to form. Compare the image of FIG. 6 on the right (with EPS and locust bean gum) to the image on the left with no EPS. The image on the right has a uniform mixture of carbohydrate/gums (light pockets) and minimized dark or black pockets that are large areas of an aqueous phase. The image on the left includes large aggregates of protein and large aqueous of water.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of producing a cream cheese that is substantially free of xanthan gum, the method comprising:
   (a) preparing a cheese curd through fermentation of a dairy liquid;
   (b) inoculating a whey protein containing dairy liquid having a whey protein level, based on solids, of about 30 to about 70 percent with an exopolysaccharide-producing culture, the inoculated whey protein containing dairy liquid being separate from the cheese curd fermentation of step (a);
   (c) fermenting the whey protein containing dairy liquid for a time and temperature to produce a biogenerated exopolysaccharide in the whey protein dairy liquid;
   (d) combining the cheese curd obtained after the fermentation of step (a) and the biogenerated exopolysaccharide-containing whey protein dairy liquid of step (c) in a mixing tank;
   (e) combining one or more stabilizers with the cheese curd and the biogenerated exopolysaccharide-containing whey protein dairy liquid, the one or more stabilizers being substantially free of added xanthan gum;
   (f) blending the combination of step (e) to form the cream cheese that is substantially free of xanthan gum,
      wherein the biogenerated exopolysaccharide produced by fermenting the whey protein containing dairy liquid is effective such that protein in the cream cheese forms a continuous protein phase with the biogenerated exopolysaccharide dispersed as particulates contained within the continuous protein phase.

2. The method of claim 1, wherein a whey stream is separated from the fermented dairy liquid of step (a) before combining the cheese curd with the biogenerated exopolysaccharide-containing whey protein dairy liquid of step (c).

3. The method of claim 1, wherein the one or more stabilizers include locust bean gum, guar gum, carrageenan gum, and mixtures thereof.

4. The method of claim 3, wherein the cream cheese is free of xanthan gum.

5. The method of claim 1, wherein the cream cheese has a fat-to-protein ratio of about 4:1 to about 5:1.

6. The method of claim 5, wherein the dairy liquid of step (a) and the whey protein containing dairy liquid of step (b) includes amounts of protein and fat to achieve the fat-to-protein ratio of the cream cheese.

7. The method of claim 1, wherein the cream cheese has about 20 to about 25 percent fat.

8. The method of claim 1, wherein the exopolysaccharide-producing culture is an EPS producing culture of *Lactobacillus rhamnosus, Lactobacillus delbrueckii* subsp. *bulgaricus, Lactobacillus lactis* ssp. *cremoris, Lactobacillus helveticus, Lactobacillus casei, Lactobacillus paracasei, Streptococcus thermophilus, Lactococcus lactis* subsp. *lactis*, or combinations thereof.

9. The method of claim 1, wherein the blended combination of step (f) builds a target yield stress of about 60 to about 90 pascals in about 40 to 80 minutes of mixing.

10. The method of claim 1, wherein the whey protein containing dairy liquid is inoculated with about 0.0005 to about 0.2 weight percent of the exopolysaccharide producing culture.

11. The method of claim 1, wherein the fermentation of the dairy liquid forming the curd includes an exopolysaccharide producing culture.

12. The method of claim 1, wherein the cream cheese exhibits a cohesiveness of about 30 to about 40 percent without added xanthan gum.

13. A cream cheese that is substantially free of xanthan gum, the cream cheese made by a process comprising:
  (a) preparing a cheese curd through fermentation of a dairy liquid;
  (b) inoculating a whey protein containing dairy liquid having a whey protein level, based on solids, of about 30 to about 70 percent with an exopolysaccharide-producing culture, the inoculated whey protein containing dairy liquid being separate from the cheese curd fermentation of step (a);
  (c) fermenting the whey protein containing dairy liquid for a time and temperature to produce a microbial derived exopolysaccharide-containing whey protein dairy liquid;
  (d) combining the cheese curd obtained after the fermentation of step (a) and the microbial derived exopolysaccharide-containing whey protein dairy liquid of step (c) in a mixing tank with added stabilizers and being substantially free of xanthan gum;
  (e) blending the combination of step (d) to form the cream cheese that is substantially free of xanthan gum,
  wherein the microbial derived exopolysaccharide produced by fermenting the whey protein containing dairy liquid is effective such that protein in the cream cheese forms a continuous protein phase with the biogenerated exopolysaccharide dispersed as particulates contained within the continuous protein phase.

14. The cream cheese of claim 13, wherein the cream cheese exhibits a firmness profile at about 5° C. of about 50,000 to about 60,000 pascals, at about 25° C. of about 6,000 to about 7,000 pascals, and at 37° C. of about 2,000 to about 3,000 pascals.

15. A cream cheese that is substantially free of xanthan gum, the cream cheese comprising:
  about 20 to about 25 weight percent fat;
  about 2 to about 5 percent protein provided from casein and whey protein;
  a fat-to-protein ratio of about 3:1 to about 5:1; one or more added stabilizers selected from locust bean gum, guar gum, carrageenan gum, and mixtures thereof, the added stabilizers being substantially free of xanthan gum;
  a biogenerated exopolysaccharide; and
  a cohesive factor of about 30 percent to about 40 percent reflecting the cheese firmness at about 37° C. relative to cheese firmness at about 25° C.,
  wherein the cream cheese comprises a cheese curd obtained by fermenting a dairy liquid,
  the biogenerated exopolysaccharide is obtained in-situ by fermenting a whey protein concentrate with an exopolysaccharide generating culture that is separate from the cheese curd fermentation to form an exopolysaccharide-containing whey protein concentrate,
  the biogenerated exopolysaccharide in the cream cheese is provided by the exopolysaccharide-containing whey protein concentrate, and
  the biogenerated exopolysaccharide produced by fermenting the whey protein concentrate is effective such that protein in the cream cheese forms a continuous protein phase with the biogenerated exopolysaccharide dispersed as particulates contained within the continuous protein phase.

16. The cream cheese of claim 15, further including a junction density between the biogenerated exopolysaccharide and the whey protein sufficient to achieve a firmness profile at about 5° C. of about 50,000 to about 60,000 pascals, at about 25° C. of about 6,000 to about 7,000 pascals, and at 37° C. of about 2,000 to about 3,000 pascals and with the cream cheese being substantially free of added xanthan gum.

17. The cream cheese of claim 15, wherein the cream cheese has a bimodal particle size distribution.

18. The cream cheese of claim 17, wherein the bimodal particle size distribution has a mean particle size of about 1 to about 8 microns, a D10 particle size of about 0.2 to about 0.4 microns, a D50 particle size of about 0.5 to about 1.0 microns, and a D90 particle size of about 15 to about 30 microns.

19. The cream cheese of claim 17, wherein a first mode of the bimodal particle size distribution has a mean particle size of about 0.3 to about 3 microns and the second mode of the bimodal particle size distribution has a mean particle size of about 20 to about 90 microns.

20. The cream cheese of claim 15, wherein the cream cheese includes about 0.02 to about 0.25 percent guar gum and about 0.05 to about 0.5 percent locust bean gum and no xanthan gum.

\* \* \* \* \*